United States Patent
Bouchette et al.

(10) Patent No.: US 6,774,063 B2
(45) Date of Patent: Aug. 10, 2004

(54) SLIP RESISTANT NONWOVEN

(75) Inventors: Michael Paul Bouchette, Sherwood, WI (US); Kevin Patrick Coffey, Little Chute, WI (US); Robert Josef Franda, Sherwood, WI (US)

(73) Assignee: Appleton Papers Inc., Appleton, WI (US)

( * ) Notice: Subject to any disclaimer, the term of this patent is extended or adjusted under 35 U.S.C. 154(b) by 172 days.

(21) Appl. No.: 10/078,195

(22) Filed: Feb. 19, 2002

(65) Prior Publication Data

US 2003/0157288 A1 Aug. 21, 2003

(51) Int. Cl.[7] .............. B32B 5/02; B32B 27/12; B32B 5/16
(52) U.S. Cl. ............ 442/151; 442/101; 442/149; 442/393; 442/417; 428/343; 428/402.2; 36/9 R; 36/7.1
(58) Field of Search ............ 442/101, 149–151, 442/393, 417; 428/40.2, 343, 402.2; 36/9 R, 7.1

(56) References Cited

U.S. PATENT DOCUMENTS

| | | | |
|---|---|---|---|
| 3,691,140 A | 9/1972 | Silver | 260/117 |
| 3,857,731 A | 12/1974 | Merrill, Jr. et al. | 428/526 |
| 4,561,435 A * | 12/1985 | McKnight et al. | 602/42 |
| 4,806,598 A | 2/1989 | Morman | 525/63 |
| 4,818,599 A | 4/1989 | Marcus | 442/333 |
| 4,872,870 A | 10/1989 | Jackson | 604/366 |
| 4,888,229 A | 12/1989 | Paley et al. | 428/192 |
| 4,943,477 A | 7/1990 | Kanamura et al. | 442/337 |
| 5,194,299 A | 3/1993 | Fry | 427/428 |
| 5,432,000 A | 7/1995 | Young, Sr. et al. | 428/372 |
| 5,484,645 A | 1/1996 | Lickfield et al. | 428/128 |
| 5,491,022 A | 2/1996 | Smith | 428/224 |
| 5,639,539 A * | 6/1997 | DeProspero et al. | 428/195.1 |
| 5,782,819 A | 7/1998 | Tanzer et al. | 604/385.04 |
| 5,824,748 A * | 10/1998 | Kesti et al. | 525/243 |
| 5,890,302 A | 4/1999 | Kirkis | 36/138 |
| 5,908,693 A * | 6/1999 | Delgado et al. | 428/343 |
| 5,926,888 A | 7/1999 | Chen et al. | 12/142 |
| 6,023,856 A | 2/2000 | Brunson et al. | 36/7.1 |
| 6,117,515 A | 9/2000 | Brunson et al. | 428/83 |

* cited by examiner

Primary Examiner—Cheryl A. Juska
Assistant Examiner—Jenna-Leigh Befumo
(74) Attorney, Agent, or Firm—Benjamin Mieliulis

(57) ABSTRACT

The present invention is a slip resistant nonwoven material. The material can be useful for surgical or clean room environments. The nonwoven is coated with microencapsulated adhesive. The microcapsule coated nonwoven is resistant for slippage. The substrate in preferred embodiments is fashioned into articles such as slip resistant table coverings or protective articles such as footwear.

9 Claims, 3 Drawing Sheets

SLIP RESISTANT NONWOVEN

BACKGROUND OF THE INVENTION

1. Field of the Invention

This invention relates to slip resistant nonwoven materials especially those useful in surgical or clean room environments. More particularly, the invention relates to nonwovens useful for forming disposable protective articles such as drapes and footwear for health care and clean room environments.

2. Description of Related Art

Nonwovens are generally understood to be random-oriented fibrous webs which are produced by a variety of fibrous web manufacturing technologies generally utilizing substantial levels of synthetic fibers, though natural fibers can also be incorporated.

In nonwoven manufacturing, web forming is often done "dry". Wet laid nonwoven manufacturing however is also known as are air laid processes which often use natural wood pulp fibers.

Fibrous webs are manufactured by at least three general processes: the wet papermaking processes; the nonwovens web making processes; and the woven textile web making processes. These three overlap each other in cost and performance. Papermaking is the lowest cost, and the products produced are the less durable. Some low end nonwovens compete with high end papers. On the other hand, woven textiles are very durable and comparably very expensive. Some high end nonwovens compete with low end woven textiles. Nonwovens may be considered as the webs which lie in between paper webs and textile webs.

Nonwovens web forming technologies include carding, air laid, spunbond, meltblown, and wet laid. Examples of additional nonwovens technologies include DRC (double recrepe), co-forming, and film aperturing.

Carding:

Carding is the oldest nonwoven technology. The easiest way to describe to the carding process is to consider the process of brushing a dog's hair. As the pet is brushed, some fibers are pulled out and gather in the bristles of the brush. Occasionally it is necessary to "reverse brush" and remove the fibers from the brush. This is somewhat like carding. In the carding process, synthetic fibers of, typically approximately 40 mm in length, are brushed out of a bale of fibers (The actual term used in the industry is "combing".) The fibers which stick in the comb are then reverse brushed to pull them out of the comb and reorient them. At the same time they are reoriented, the fibers are laid down on a carrier screen to form a web. Orientation of these fibers is typically linear because the barbs on the rolls which do the combing are fixed in place. Thus virtually all of the fibers are lined up with the machine direction of the web. The cross direction orientation can be increased by additional processes such as randomizing and crosslapping. Because nonwoven carded webs have a high fiber orientation, it is generally necessary to do some type of additional bonding beyond that which occurs naturally with fiber entangling. Bonding may be done through chemical bonding, thermal bonding, or mechanical entanglement. Carded products utilize synthetic fibers, but also natural fibers like cotton and wool.

A limitation to the use of natural fibers in carding is that carding requires relatively long fibers to work well. Since carding occurs in air, it is also sometimes referred to as an air laid product or a dry laid product.

Air Laid:

Air laid web forming is more typically characterized by the fibers actually being deposited from an air stream onto a carrier fabric to form the nonwoven web. Webs formed by this process have high loft and high pore volume. Wood pulp fibers are the predominant fibers used in air laid manufacturing, and they are typically 2–3 mm in length. Longer, synthetic fibers can be added with lengths up to about 12 mm, but the most common usage is at about 4–6 mm due to machine handling considerations. The use of longer fibers is desirable in that they entangle better than wood pulp, and are generally stronger than wood pulp. Air laid webs are typically chemically bonded by spraying an emulsion polymer on both sides of the web. Bonding can also be achieved by the incorporation of synthetic fibers and the use of thermal bonding. Multi-bonding is used to describe air laid webs which have primary internal thermal bonding, and then a chemical topcoat to tie down loose fibers. Synthetic fibers are finding increased usage in these nonwovens.

Spunbond:

The spunbond process is characterized by the use of molten polymers, extruded through fine orifices to form essentially continuous fibers. Moving orifices and/or directed air streams cause the fibers to twirl around and overlap one another as they deposit on a moving carrier screen. The nonwoven web thus formed may be bonded by a degree of mechanical fiber entanglement; it may be bonded through final solidification of the molten fibers occurring after the web is formed and the fibers contact one another; it may be bonded through additional thermal treatments; or it may be bonded through chemical treatments. Nonwoven webs produced by the spunbond process are usually very strong, but have a high synthetic handfeel.

Meltblown:

The meltblown process is very similar to the spunbond process except for three major differences: 1) In the making of meltblown fibers, the air attenuation process used in fiber drawing causes the fibers to break with much shorter fiber lengths than in the spunbond process. 2) In the meltblown process, the design of the air flow used to draw the fibers out from the extrusion orifices also causes the fiber diameters to be much smaller than those found in the spunbond process, and 3) The fiber attenuation airflow used in the meltblown process occurs much closer to the extrusion orifice, and therefor it forms and cools the fibers before the extruded polymer has had a chance to molecularly orient itself. This creates fibers which are weaker than those found in the spunbond process. Because the meltblown process has shorter fiber lengths, there is more natural entanglement in the final nonwoven web, and some meltblown webs require no further bonding. Generally, however, thermal bonding via heated emboss rolls is the bonding method of preference.

Wetlaid:

The wetlaid nonwovens processes are basically just adaptations on regular papermaking machines. The manufacture of wet laid nonwovens utilizes three key variables compared to papermaking: 1) some synthetic fibers and/or longer other naturally occurring fibers (e.g. hemp) are included in the furnish; 2) selective chemical additives are used to properly disperse and suspend the synthetic fibers in the water slurry; and 3) the papermaking machine is redesigned and altered to allow better fiber handling and water drainage. The use of synthetic fibers in combination with wood pulp fibers in the wet laid process is limited by the degree to which the synthetic fibers can be kept suspended in water similar to the way this is done with wood pulp fiber. This suspendability, in turn, is affected by the density of the synthetic fibers, the surface wetting characteristics of the synthetic fibers, and the length of the synthetic fibers. Machine handling limitations in wet laid nonwovens generally rely on synthetic fiber lengths of about 8 mm or less. A high degree of bonding occurs through the normal entanglement of the fibers in the web forming process. Significant additional strength is sometimes generated by utilization of the bonding technology known as hydroentanglement.

DRC:

In the DRC (double re-crepe) process, a deliberately designed very weak sheet of paper is chemically bonded by design printing an emulsion polymer on one side of the sheet. The wet side of this sheet is immediately stuck to a large cylindrical dryer where the drying process begins. The drying process causes the sheet to stick to the dryer, and it is necessary to crepe the sheet in order to release it. The same sheet is then printed on the other side and dried and creped again. The resulting nonwoven product is far more durable than the original base sheet of paper, and the creping steps soften the hand feel and increase the absorbent characteristics of the sheet.

Co-Forming:

Co-forming is a process for adding wood pulp fibers to a molten polymeric fiber stream in a melt blown process. A key benefit of this process is the cost reduction associated with the wood pulp fibers, but the addition of the wood pulp fibers also brings about some different nonwoven web properties.

While both spunbond and meltblown webs are formed from fibrous extrusion of molten polymers, films may also be formed from molten polymers. Films which have been modified with perforations and the like to increase porosity are also considered nonwovens for purposes hereof.

There are three primary classes of fiber-to-fiber bonding found in nonwovens.

Mechanical fiber entanglement occurs when in the web forming process fibers come in contact with each other and become intertwined.

Mechanical entanglement may be enhanced through several different techniques. One such technique is called aperturing. In aperturing, small jets of water are used to blast through the web while it is still supported on a carrier wire. As the water jets penetrate the web, they carry adjacent fibers with them, thereby penetrating or entangling the fibers down into the web.

A variation on aperturing is called hydroentangling. In hydroentangling, smaller jets of water are used with high pressures. The same reorientation of fibers occurs as in aperturing, but to a much larger extent. Furthermore, the pressures in hydroentanglement are sufficient so that the jets of water actually have their direction reversed as they pass through the web and hit the carrier wire. This causes some of the water to come back up through the web, also carrying fibers with it again, only now in the reverse direction. Hydroentangled webs are fairly strong, and can approach or even exceed certain textiles. Hydroentangling is not only used as a primary bonding technology, but it is also used as a binderless lamination technology.

Another example of mechanical bonding is needle punching. Needle punching utilizes barbed needles which penetrate down through the web. This is an older process, and it used primarily with very thick webs, such as might be found in the carpet manufacturing industry and/or highloft batting manufacturing.

Another mechanical bonding is stitch bonding. Stitch bonding is literally sewing the fibers together, just as one would sew fabric together. Stitch bonding is not so much utilized as a lamination technique as it is as a primary bonding enhancement technique. Its use in nonwovens is not yet wide spread, but it is finding a home in the upscale products with high durability.

Chemical bonding involves bonding through the addition of adhesive-like chemicals. Chemical bonding is also referred to as "resin bonding". The most common form of chemical bonding is achieved by running the web through a saturation bath of an emulsion polymer. In some cases complete saturation is not used, and the emulsion polymer is "printed" on by use of a gravure roll. In other cases, the emulsion polymer is sprayed onto the surface of the web. And in still other cases, a chemical is applied which causes the fibers to become reactive and bond with each other.

Thermal bonding is accomplished in at least two different ways. In the simplest way, the synthetic fibers are subjected to an overall melt temperature which causes them to soften. As the softening occurs, the fibers stick together. As the fibers cool this stickiness becomes permanent. Typically a drying oven is used for this type of heat transfer, but heated smooth compaction rolls may also be used. In a more complicated way, a web is run though a heated emboss roll nip, and the male portion of the emboss roll imparts a pattern on the web at the same time it is melting and bonding the fibers within that pattern. The fibers can also be designed to consist of two components with different melt temperatures. These are called bicomponent fibers. As one part of the fiber melts, it is still relatively held extended in place by the other part of the fiber. But wherever a molten part of the fiber touches another fiber (molten or not) bonding will occur as the molten part of the fiber cools. Most typically this type of thermal bonding occurs via an overall exposure to heat (e.g. a drying over), but there are some cases where heated emboss rolls are also used.

Nonwoven blends or fabrics are formed of many synthetic and natural fibers. Nonwoven fabrics find a variety of uses in towels, wipes, disposable garments, and layering for sanitary napkins and diapers. Methods and apparatus for forming entangled nonwoven fabrics are further described in U.S. Pat. No. 3,485,706. Interfiber frictional contact provides strength to the fabric. In addition to that described above, increased strength is achievable by addition of various additives, binders or adhesives to increase interfiber attachment.

A variety of synthetic materials such as polyolefins have been used to form nonwoven fabrics. Thermoplastics finding use in nonwoven fabrics include polyethylene and polypropylene, and materials such as nylon, polyesters and other synthetics. Disposable absorbent fabrics have typically been comprised of a batt or absorbent portion which is covered with a nonwoven liner. The batt is often a cellulose fiber material or polyester fiberfill (U.S. Pat. No. 4,818,599 incorporated herein by reference) or fiberglass or the like.

Nonwoven blends or fabrics are produceable by melt-blowing or spunbonding techniques. Such techniques can create a matrix of thermoplastic fibers engaging at least some of the matrix fiber spaced apart from each other. The individualized fibers are interconnected within the matrix by mechanical entanglement of the matrix fibers. The mechanical entanglement and interconnection of the matrix fibers forms the structure. Heat, adhesive or binder can be used to increase interconnections and interconnection strength of the matrix fibers.

Nonwoven webs can be formed by meltblowing and conforming, meltspinning techniques, collected as a tow and converted to staple fibers. Nonwovens can be prepared by carding or air forming.

Meltblown fibrous webs can be made from fibers formed by extruding molten thermoplastic material through fine die capillaries to form molten threads or filaments which are then attenuated using high velocity gas. The resulting fibers have diameters usually of less than 10 microns and can be collected on a forming surface in the form of a fibrous nonwoven batt with very small pore structures that can inhibit fluid flow as taught by U.S. Pat. No. 3,849,241.

If desired, particularly with a nonwoven comprising a laminated sheet with an absorbent batting middle layer, an absorbent composition from 5 to 90 percent of the matrix fiber can also optionally be included in the absorbent batting, for moisture retention. Such materials are taught in U.S. Pat. No. 4,757,825 incorporated herein by reference. U.S. Pat. No. 3,783,872 describes use of polyalkylene oxide hydrogels as powders or films. Cross-linked isocyanate-capped poly(oxyalkylene) glycols, polyurethanes and polyureas are described in U.S. Pat. No. 3,939,105 and U.S. Pat. No. 4,806,598.

Nonwovens and/or nonwoven laminates sandwiching natural or synthetic batting fibers, optionally incorporated superabsorbents, can be used to form useful cloth-like materials, wipes, napkins, paddings. If made in sheet-like thicknesses, these materials and laminates can be used to form cloth-like or garment materials.

Disposable garments can be fashioned from nonwovens and/or nonwoven laminates with natural or synthetic batting fibers. Disposable garments have gained acceptance particularly in surgical and clean room environments.

When protective garments are fashioned from cloth-like materials relying on nonwoven outer layers, one problem in some applications has been the low coefficient of friction of many of the synthetics such as polyolefin-based nonwovens.

When surgical footwear coverings are fashioned from such nonwovens, it has been found necessary or desirable to add frictional surfaces to the portion of the footwear contacting the floor to add traction and reduce the chance of slippage.

SUMMARY OF THE INVENTION

Figure 1:
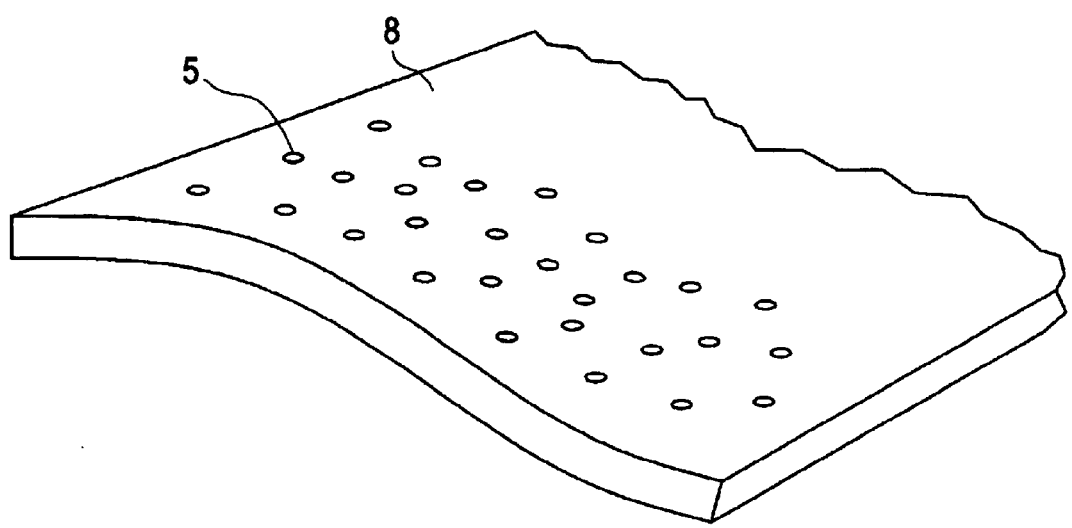
FIG. 1 is a schematic depicting a sheet material of the invention.

The present invention is an improved nonwoven resistant to slippage comprising a nonwoven substrate having top and bottom surfaces, at least one surface of the nonwoven substrate being coated with microcapsules containing an adhesive, and the microcapsule coated nonwoven having an average drag force of at least 250 grams are determined by the test method set forth herein in the examples.

One embodiment of the above described nonwoven resistant to slippage is a table covering. An alternative embodiment of the described nonwoven resistant to slippage is disposable footwear.

In a further alternative embodiment, the nonwoven substrate has a second material laminated to a surface of the nonwoven and coated with microcapsules containing an adhesive. The second material is a breathable synthetic material such as fractured plastic film or a second nonwoven sandwiching a batting material. Optionally, the batting material can be absorbent.

In a further embodiment, the improved laminate for forming disposable footwear for health care or clean room environments comprises a first covering layer of a fractured plastic film and at least one layer of a nonwoven web material. The first covering layer of fractured plastic film is coated with microcapsules containing an adhesive. The microcapsule coated plastic film has drag force of at least 250 grams, as determined by the test method set forth in the examples herein.

In another embodiment an improved substrate for forming disposable footwear for health care or clean room environments is taught comprising a substrate having at least one layer of nonwoven material. At least one surface of said substrate is coated with microcapsules containing an adhesive. The microcapsule coated surface has a drag force of at least 250 grams as determined by the test method set forth in the examples.

The laminate is folded along a longitudinal axis to form two mirror image panels. A first covering layer of fractured plastic film can optionally be selected as the exterior. The mirror image panels are joined together at outer edges by a continuous seam to form a shoe covering except for an opening being provided for the wearer's foot. The edges forming the opening are provided with a resilient material to snugly close the opening around the wearers foot. Optionally, the resilient material is provided along the edge forming the opening and long the length of the continuous seam.

In yet another embodiment an improved laminate for forming disposable footwear for health care or clean room environments is disclosed compromising at least one covering layer of a nonwoven web material. The covering layer of nonwoven web material is coated with microcapsules containing an adhesive. The microcapsule coated nonwoven web material has a drag force of at least 250 grams. The laminate is folded along a longitudinal axis to form two mirror image panels. The first covering layer of nonwoven web material is selected as the exterior. The mirror image panels are joined together at outer edges by a continuous seam to form a shoe covering except for an opening being provided for the wearer's foot. The edges forming the opening are provided with a resilient material to snugly close the opening around the wearer's foot. The improved laminate includes a second layer of a batting material attached to the covering layer, or sandwiched between two layers of nonwoven material. Optionally the batting material includes a hydrogel absorbent dispersed in the batting material.

DETAILED DESCRIPTION

The present invention is an improved nonwoven resistant to slippage. The nonwoven substrate is primarily a two dimensional material having at least one external surface. In a preferred embodiment, the improved nonwoven resistant to slippage is fashioned as a bootie worn as a foot covering or shoe covering. At least one surface of the nonwoven substrate is coated with microcapsules containing an adhesive. Depending on material selection this outer layer can be any of the nonwovens herein described in the section describing "related art", including nonwoven materials such as fractured films or web type materials.

Processes of microencapsulation are now well known in the art. U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrenesulfonic acid. Microcapsules are also taught in U.S. Pat. Nos. 2,730,457 and 4,197,346. The more preferred microcapsules are from urea-formaldehyde resin and/or melamine formaldehyde resin as disclosed in U.S. Pat. Nos. 4,001,140; 4,081,376, 4,089,802; 4,100,103; 4,105,823; 4,444,699 or most preferably alkyl acrylate—acrylic acid copolymer capsules as taught in U.S. Pat. No. 4,552,811, each patent described is incorporated herein by reference to the extent each provides guidance regarding microencapsulation processes and materials.

U.S. Pat. No. 4,622,267 incorporated herein by reference discloses an interfacial polymerization technique for preparation of microcapsules. Interfacial polymerization is a process wherein a microcapsule wall of a polyamide, an epoxy resin, a polyurethane, a polyurea or the like is formed at an interface between two phases. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429. The microencapsulation processes of U.S. Pat. No. 3,516,941 are also incorporated herein by reference. This patent teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules proceeds via interfacial polymerization.

Common microencapsulation processes can be viewed as a series of steps. First, the core material which is to be encapsulated is emulsified or dispersed in a suitable dispersion medium. This medium is preferably aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Gelatin or gelatin-containing microcapsule wall material is well known. The teachings of the phase separation processes, or coacervation processes which are described in U.S. Pat. Nos. 2,800,457 and 2,800,458 are incorporated herein by reference. Uses of such capsules are described in U.S. Pat. No. 2,730,456.

More recent processes of microencapsulation involve, and preferred herein, are the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine, as taught in U.S. Pat. No. 4,552,811 is incorporated by reference. These materials are dispersed in an aqueous vehicle and the reaction is conducted in the presence of acrylic acid-alkyl acrylate copolymers.

A method of encapsulation by a reaction between urea and formaldehyde or polycondensation of monomeric or low molecular weight polymers of dimethylol urea or methylated dimethylol urea in an aqueous vehicle conducted in the presence of negatively-charged, carboxyl-substituted, linear aliphatic hydrocarbon polyelectrolyte material dissolved in the vehicle, as taught in U.S. Pat. Nos. 4,001,140; 4,087,376; and 4,089,802 is incorporated by reference.

A method of encapsulating by in situ polymerization, including a reaction between melamine and formaldehyde or polycondensation of monomeric or low molecular weight polymers of methylol melamine or etherified methylol melamine in an aqueous vehicle conducted in the presence of negatively-charged, carboxyl-substituted linear aliphatic hydrocarbon polyelectrolyte material dissolved in the vehicle, is disclosed in U.S. Pat. No. 4,100,103, is incorporated by reference.

A method of encapsulating by polymerizing urea and formaldehyde in the presence of gum arabic as disclosed in U.S. Pat. No. 4,221,710 is incorporated by reference. This patent further discloses that anionic high molecular weight electrolytes can also be employed with the gum arabic. Examples of the anionic high molecular weight electrolytes include acrylic acid copolymers. Specific examples of acrylic acid copolymers include copolymers of alkyl acrylates and acrylic acid including methyl acrylate-acrylic acid, ethyl acrylate-acrylic acid, butyl acrylate-acrylic acid and octyl acrylate-acrylic acid copolymers.

A method for preparing microcapsules by polymerizing urea and formaldehyde in the presence of an anionic polyelectrolyte and an ammonium salt of an acid as disclosed in U.S. Pat. Nos. 4,251,386 and 4,356,109 is incorporated by reference. Examples of the anionic polyelectrolytes include copolymers of acrylic acid. Examples include copolymers of alkyl acrylates and acrylic acid including methyl acrylate-acrylic acid, ethyl acrylate-acrylic acid, butyl acrylate-acrylic acid and octyl acrylate-acrylic acid copolymers.

The core material of the microcapsule is preferably selected from addition polymerizable prepolymers such as an acrylate or methacrylate. Examples of these types of materials include material such as alkyl acrylate, aralkyl acrylate, cycloalkyl acrylate, alkoxy acrylate, cycloalkoxy acrylate, bicycloalkyl acrylate, alkoxy (alkoxy)$_n$ acrylate, alkyl methacrylate, aralkyl methacrylate, cycloalkyl methacrylate, alkoxy methacrylate, bicycloalkyl methacrylate, cycloalkoxy methacrylate, and alkoxy (alkoxy)$_n$ methacrylate. The alk or alkyl moieties should be selected preferably of 1 to 16 carbons, the cycloalkyl moieties from 4 to 8 carbons, and n is an integer from 1 to 6.

Illustrative compounds, not by way of limitation include: n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, 2-ethylhexyl methacrylate, n-octyl methacrylate, iso-octyl acrylate, iso-octyl methacrylate, isononyl acrylate, isodecyl acrylate, 2-ethoxyethyl methacrylate; butyl diglycol methacrylate; tetrahydrofurfuryl acrylate; 2-phenoxyethyl acrylate, isohexyl acrylate; tridecyl acrylate; tridecyl methacrylate; ethoxylated nonyl phenol acrylate and the like and mixtures thereof.

The core material can include any conventional pressure sensitive adhesive. Nonlimiting examples of such adhesives include polyacrylates, polymethacrylates, polyvinylethers, natural or synthetic rubber materials, silicone, polyurethane, styrene-butadiene, cis-polybutadiene, styrene-isoprene block copolymers, and vinyl acrylate blends.

The microcapsules used in the invention comprise a pressure sensitive or flowable adhesive in a microcapsule, the capsule made, for example, by providing an aqueous mixture of a polyacrylic wall material blended with partially methylated methylol melamine resin. The acrylic wall material preferably is selected from alkyl acrylate-acrylic acid copolymer and polyacrylic acid, together with partially methylated methylol melamine resin.

To the aqueous mixture can be added a substantially water insoluble core material and free radical initiator, the core material comprising an adhesive forming pre-polymer and optionally a second pre-polymer such as a diacrylate, dimethyacrylate, or polyester acrylate for providing interaction or cross-linking between polymer chains.

High shear agitation is provided to the aqueous mixture to achieve a droplet size of less than about 250 $\mu$, preferably less than 100 $\mu$, and more preferably less than 50 $\mu$. In certain applications droplet sizes of around 10$\mu$ may be preferable. The mixture is stirred at a first temperature to effect capsule wall formation. It should be readily understood by those skilled in the art that this may be accompanied by a pH shift with wall materials such as gelatin to promote the phase separation in the wall formation step, as taught in patents such as U.S. Pat. Nos. 2,800,457 and 2,800,458 is incorporated by reference.

With gradual heating to a first temperature, capsule wall forms around the combination of monomers (or prepolymer), additives and free radical initiator. Continued agitation of the emulsion while raising the temperature to a second causes the adhesive monomer core material to polymerize.

A free radical source such as an azo initiator or organic peroxide is generally used in an amount of up to 1.5% by weight.

The free initiator can be selected from the group of initiators comprising an azo initiator, peroxide, dialkyl peroxide, alkyl peroxide, peroxyester, peroxycarbonate, peroxyketone, peroxydicarbonate, and the like.

Polyolefin sheet materials typically have low frictional coefficients resulting in materials that are prone to slip. In sheet form or when formed into useful articles such as foot coverings, such slippage can be undesirable.

A polyolefin sheet material when coated within a microencapsulated adhesive displays considerably increased drag resistance, requiring substantially higher breaking force to impart movement or slippage to the material.

In the form of a foot covering, this type of material presents considerable safety enhancements at less cost than some conventional methods of adding rubberized pads or strips. Desirably, the nonwoven with microcapsules displays tack or drag resistance in areas where the capsules become ruptured, which tends to coincide with areas subjected to contacting forces. Other areas of the nonwoven tend to remain tack free.

Representative adhesion values for various materials have been reported such as for example: acetate tape 107 g/cm; masking tape 227 g/cm; and package sealing tape 830 g/cm. (U.S. Pat. No. 5,194,299 incorporated herein by reference). For comparison purposes, preferred adhesion values for the instant invention are in the area of 5 to 50 grams per centimeter width. The tack should be so much as to prevent slip but not so strong to interfere with easy repositioning.

The pressure sensitive adhesive is preferably a microencapsulated acrylate prepolymer with a free radical initiator in the presence of a solvent. Such microencapsulated adhesives are taught in commonly assigned Ser. No. 60/230,365 filed Sep. 6, 2000 incorporated herein by reference.

A preferred capsule core material is 2-ethylhexyl acrylate, caprolactone acrylate, polybutene resin with an azo initiator. The capsule material is preferably alkyl acrylate—acrylic acid copolymer, such as butylacrylate-acrylic acid copolymer together with methylated methylol melamine resin.

In one embodiment of the invention the nonwoven substrate resistant to slippage is a table covering. In an alternate embodiment the nonwoven resistant to slippage is formed into disposable footwear.

Optionally, the nonwoven substrate can be laminated with a second material such as a fractured plastic material, a breathable synthetic or a barrier material. In yet another optional laminate construction, the substrate is a multi-layer construction of a nonwoven material sandwiching a batting material or an absorbent hydrogel material.

The present invention is an improved laminate comprising at least one covering layer of a nonwoven material, the covering layer of nonwoven material being coated with microcapsules containing an adhesive. The microcapsule-coated nonwoven material provides enhanced friction when a protective footwear article is fashioned from the laminate. The microcapsules face the exterior of the footwear article.

The adhesive is selected to provide a microcapsule coated nonwoven material having improved breaking force in terms of slip. The adhesive should be selected to have a high coefficient of friction or drag force of at least 250 grams, but not so tacky as to adhere to floor surfaces when the footwear is being worn.

A shoe cover may be formed from laminated nonwoven material blanks. The shoe covering preferably includes an opening that enables the shoe cover to be slipped over the foot or shoes of the wearer. The opening can optionally include a stretchable or resilient material such as rubber or elastomer to maintain the shoe cover on the foot of the wearer.

Optionally if desired the outer nonwoven material can be covered by fractured plastic films such as DEL NET®, GORE-TEX®, VISIPOR® or VISIQUEEN® plastic films.

Additionally, the present invention is a novel and improved laminate for forming disposable footwear for health care or clean room environments. The laminate can comprise an optional first covering layer of a fractured plastic film. Optionally, the fractured film has a vapor transmission rate of at least 100 grams per square meter per ASTM Method ES 22-1992. Fractured plastic films include a large number of holes or cracks which may be selectively designed to pass limited quantities and/or types of fluids therethrough. Fractured plastic films are known and their manufacture described in detail in patents such as U.S. Pat. No. 6,117,515 relating to low particulating disposable products. Additional examples of fractured films for use in the present invention are taught in U.S. Pat. No. 3,616,154 "Nonwoven Open Work Net Structure of Thermoplastic Material"; U.S. Pat. No. 3,929,135 "Absorbative Structure Having Tapered Capillaries"; U.S. Pat. No. 3,953,566 "Process for Producing Porous Products"; and U.S. Pat. No. 4,187,390 entitled Porous Products and Process Therefore. These patents are incorporated by reference to the extent each provides guidance with regard to design and manufacture of fractured plastic films.

At least one layer of a nonwoven web material is typically positioned below the covering layer of fractured plastic film. The first covering layer of fractured plastic film can be coated with microcapsules containing an adhesive. The microcapsule coated fractured plastic film is selected to have a drag force of at least 250 grams when the capsules are ruptured.

More particularly, the invention is an improved laminate for forming disposable footwear for health care or clean room environments comprising a first optional covering layer of a fractured plastic film having a vapor transmission rate of at least 100 grams per square meter per ASTM Method ES 22-1992, at least one layer of a nonwoven web material, said first covering layer of fractured plastic film nonwoven web material being coated within microcapsules containing an adhesive, said microcapsule coated plastic film having a drag force of at least 250 grams, said laminate being folded along a longitudinal axis to form two mirror image panels, the first covering layer of fractured plastic material selected as the exterior, said mirror image panels being joined together at outer edges by a continuous seam to form a shoe covering except for an opening being provided for the wearer's foot, said edges forming the opening being provided with a resilient material to snugly close the opening around the wearer's foot.

Optionally and desirably, a resilient material is provided along the edge forming the opening and long the length of the continuous seam, to snugly hold the footwear over the wearer's shoe.

Alternatively, the invention is an improved laminate for forming disposable footwear for health care or clean room environments comprising at least one covering layer of a nonwoven web material, said covering layer of nonwoven web material being coated with microcapsules containing an adhesive, said microcapsule coated nonwoven web material preferably having a drag force of at least 250 grams, said laminate being folded along a longitudinal axis to form two mirror image panels, the first covering layer of nonwoven web material selected as the exterior, said mirror image panels being joined together at outer edges by a continuous seam to form a shoe covering except for an opening being provided for the wearer's foot, said edges forming the opening being provided with a resilient material to snugly close the opening around the wearer's foot.

Optionally, the improved laminate employing one or more layers of a nonwoven material includes a second layer of a batting material attached to the covering layer.

FIG. 1 is a schematic depicting a sheet material of the invention. Nonwoven substrate 8 is shown with a coating of microencapsulated adhesive 5.

Figure 2:
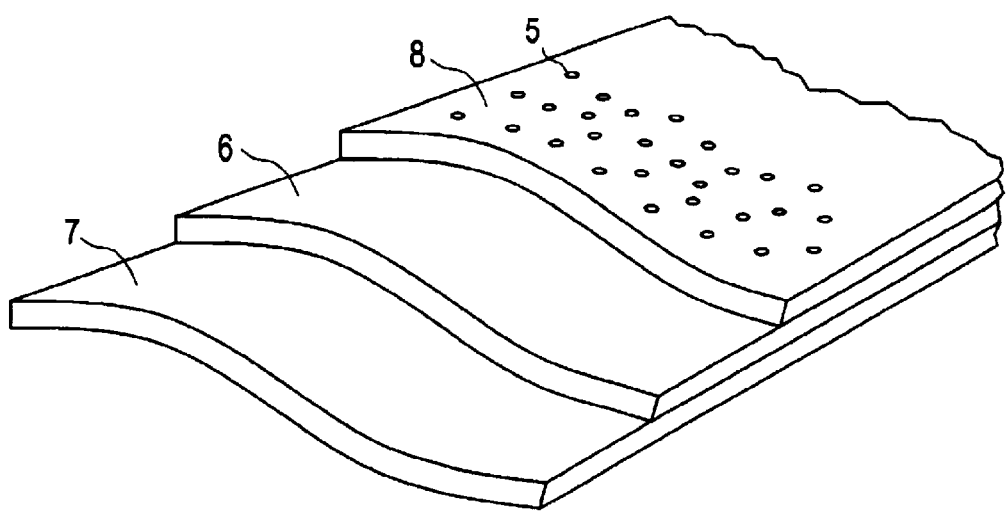
FIG. 2 is a schematic of an alternative embodiment depicting a microcapsule coated laminate.

FIG. 2 is an alternative embodiment depicting a laminated structure. Nonwoven 8 with a coating of microencapsulated adhesive 5 is laminated to batting layer 6 and laminated to layer 7. Layer 7 can optionally be a nonwoven similar to nonwoven 8 or can be selected to be a fractured plastic film or other nonwoven.

Optionally the fractured plastic film can be the top layer and microencapsulated adhesive 5 applied to the plastic film.

Figure 3:
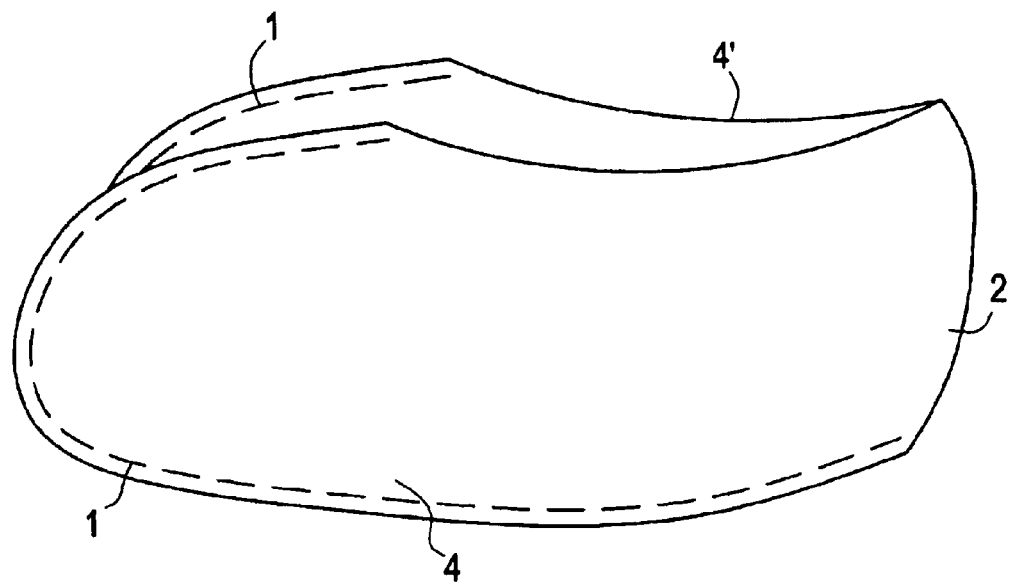
FIG. 3 is a side view of two mirror image panels folded along a longitudinal axis for forming disposable footwear according to the invention.

FIG. 3 is a sideview of a nonwoven shown as two mirror image panels 4 and 4' folded along longitudinal axis 2. Stitching 1 can be used to join the panels. Alternatively, other conventional means of joining such as gluing, hot melting or thermal bonding, stapling, fiber entanglement, and the like can readily be selected in place of stitching. Longitudinal axis 2 can also be positioned along the bottom with mirror image panels 4 and 4'then folded upwards instead. Microencapsulated adhesive is placed on the external surface of panels 4 and 4'.

Figure 4:
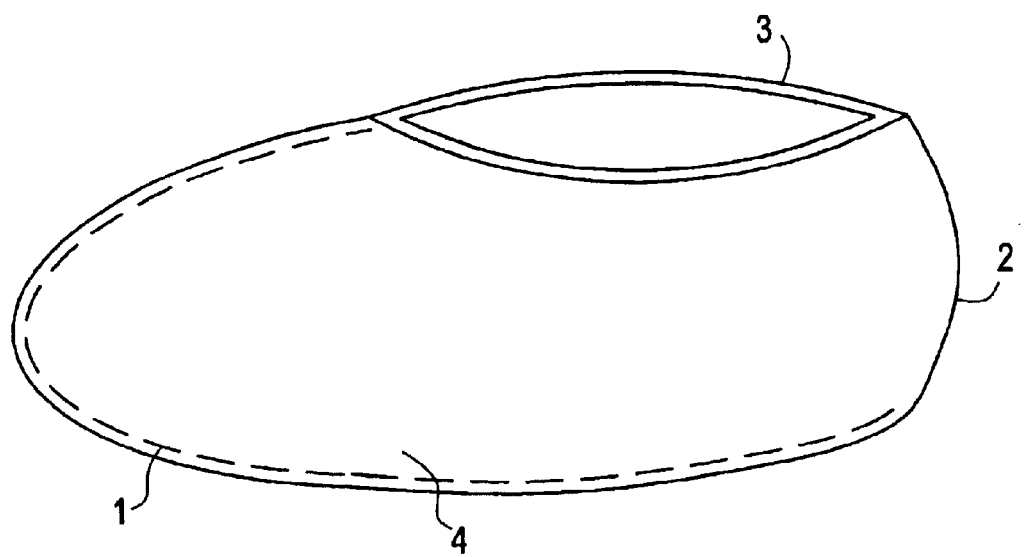
FIG. 4 is a schematic showing a side view of disposable footwear according to the invention.

FIG. 4 is a schematic of disposable footwear according to the invention. Panel 4 is folded along longitudinal axis 2 and fastened together with stitching 1. Around the footwear opening a resilient material such as a stretchable elastomeric 3 is provided for snugly securing the footwear.

EXAMPLE 1

Calculation of Drag Force.

A 2.5 cm diameter sheet of a polyolefin nonwoven was coated with microcapsules containing an encapsulated adhesive and compared to a polyolefin nonwoven without such coating.

A 100 gram weight was placed on each sample. The samples are dragged laterally across a polished stainless steel plate. The breaking force (or states drag force) is measured by the maximum instantaneous force reading taken at the moment before initial frictional forces are broken.

The instrument used is a Chem Instruments AR-1000. The lateral drag speed was 12 inches per minute. Dynamic drag forces are measured as the average of the instantaneous force readings taken during a steady state drag.

|  | Dynamic Drag Force | Static Drag Force |
| --- | --- | --- |
| Uncoated polyolefin nonwoven | 49.80 grams | 115 grams |
| Capsule coated polyolefin nonwoven | 260.4 grams | 296.3 grams |
| Capsule coated polyolefin nonwoven with capsules shattered | 326.3 grams | 719.3 grams |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes can be made by those skilled in the art without departing from the spirit and scope of the invention.

We claim:

1. A nonwoven resistant to slippage comprising: a nonwoven substrate having top and bottom surfaces, at least one surface of said nonwoven substrate being coated with microcapsules containing an adhesive, said microcapsule coated nonwoven having an average drag force of at least 250 grams and an adhesion value of 5 to 50 grams per centimeter width, said nonwoven substrate having a second material laminated to the opposite surface of the nonwoven.

2. A nonwoven resistant to slippage comprising: a nonwoven substrate having top and bottom surfaces, at least one surface of said nonwoven being coated with microcapsules containing an adhesive, the nonwoven substrate having a second material of a breathable synthetic material laminated to the opposite surface of the nonwoven.

3. A substrate for forming disposable footwear for health care or clean room environments comprising:

a substrate having at least one layer of nonwoven material, at least one surface of said substrate being coated with microcapsules containing an adhesive, said microcapsule coated substrate having a drag force of at least 250 grams, said laminate being folded along a longitudinal axis to form two mirror image panels, the surface coated with microcapsules containing an adhesive selected as the exterior, said mirror image panels being joined together at outer edges by a continuous seam to form a shoe covering except for an opening being provided for the wearers foot, a resilient material being provided at the opening to snugly close the opening around the wearers foot.

4. The laminate according to claim 3 wherein the resilient material is provided along the edge forming the opening and along the length of the continuous seam.

5. A laminate for forming disposable footwear for health care or clean room environments comprising:

a substrate having at least one covering layer of a nonwoven material, said nonwoven material being coated with microcapsules containing an adhesive, said microcapsule coated nonwoven material having a drag force of at least 250 grams, said laminate being folded along a longitudinal axis to form two mirror image panels, the nonwoven material is selected as the exterior, said mirror image panels being joined together at outer edges by a continuous seam to form a shoe covering except for an opening being provided for the wearer's foot, a resilient material being provided surrounding the opening to snugly close the opening around the wearers foot.

6. The laminate according to claim 5 wherein the laminate includes a second layer of a batting material attached to the covering layer.

7. The laminate according to claim 6 where the batting material includes a hydrogel absorbent dispersed in said batting material.

8. The laminate according to claim 7 wherein the batting material is sandwiched between the covering layer of nonwoven material and a second layer of nonwoven material.

9. The laminate according to claim 5 wherein the laminate includes in addition a layer of a fractured plastic film.

* * * * *